US012559083B2

(12) United States Patent
Diamond et al.

(10) Patent No.: US 12,559,083 B2
(45) Date of Patent: Feb. 24, 2026

(54) CONTROL SYSTEM FOR INDIVIDUAL ACTUATION OF BRAKE CALIPER PISTONS

(71) Applicant: FORD GLOBAL TECHNOLOGIES, LLC, Dearborn, MI (US)

(72) Inventors: Brendan Diamond, Gross Pointe, MI (US); Matthew Johnson, Toledo, OH (US); David Michael Russell, Ann Arbor, MI (US); Keith Weston, Canton, MI (US); Victor Martinez, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 461 days.

(21) Appl. No.: 18/203,976

(22) Filed: May 31, 2023

(65) Prior Publication Data

US 2024/0400031 A1      Dec. 5, 2024

(51) Int. Cl.
 *B60T 17/22*       (2006.01)
 *F16D 55/226*      (2006.01)
        (Continued)

(52) U.S. Cl.
 CPC ........ *B60T 17/221* (2013.01); *F16D 65/0068* (2013.01); *F16D 66/027* (2013.01); *F16D 55/226* (2013.01)

(58) Field of Classification Search
 CPC ...... B60T 13/741; B60T 17/22; B60T 17/221; B60T 13/745; B60T 1/065; F16D 65/0068; F16D 66/027; F16D 55/226
 See application file for complete search history.

(56) References Cited

U.S. PATENT DOCUMENTS

| | | | |
|---|---|---|---|
| 5,975,250 A | 11/1999 | Brandmeier et al. | |
| 7,806,241 B2 * | 10/2010 | Takahashi ............. | B60T 13/746 |
| | | | 188/73.2 |

(Continued)

FOREIGN PATENT DOCUMENTS

| | | |
|---|---|---|
| CN | 111344200 A | 6/2020 |
| DE | 4241814 A1 | 6/1994 |

(Continued)

OTHER PUBLICATIONS

German Patent No. DE 102021203735 to Pla et al published on Oct. 20, 2022.*

*Primary Examiner* — Pamela Rodriguez
(74) *Attorney, Agent, or Firm* — Burr & Forman; Lorne Forsythe

(57)        ABSTRACT

A vehicle control system may include a first friction brake member that rotates with a wheel of the vehicle, a second friction brake member that is displaced from an initial position to initiate contact with the first friction brake member to apply braking torque to the wheel, a displacement assembly operably coupled to the second friction brake member to move the second friction brake member responsive to a brake torque request, a sensor network to measure displacement information of the displacement assembly from the initial position to a point of contact between the first and second friction brake members, and a control module operably coupled to the sensor network to record the displacement information to define recorded displacement information, and to determine tapering of the second friction brake member based on the recorded displacement information.

20 Claims, 5 Drawing Sheets

(51) Int. Cl.
     *F16D 65/00*      (2006.01)
     *F16D 66/02*      (2006.01)

(56)                    References Cited

U.S. PATENT DOCUMENTS

|  |  |  |  |
|---|---|---|---|
| 9,353,811 | B2 | 5/2016 | Gutelius et al. |
| 9,592,813 | B2 | 3/2017 | Chelaidite |
| 10,232,836 | B2 | 3/2019 | Schneider et al. |
| 10,259,439 | B2 | 4/2019 | Suermann et al. |
| 10,525,958 | B2 | 1/2020 | Barbosa et al. |
| 2018/0031065 | A1* | 2/2018 | Shabbir ................ F16D 66/026 |
| 2019/0120311 | A1 | 4/2019 | Al-mahshi |
| 2020/0122695 | A1 | 4/2020 | Rossi et al. |
| 2021/0380089 | A1 | 12/2021 | Dossi et al. |

FOREIGN PATENT DOCUMENTS

|  |  |  |  |
|---|---|---|---|
| DE | 19850384 | A1 | 8/1999 |
| DE | 10137881 | A1 | 5/2002 |
| DE | 102006033333 | A1 | 8/2007 |
| EP | 3263414 | A1 | 1/2018 |
| JP | 2008312436 | A | 12/2008 |
| JP | 4768376 | B2 | 9/2011 |
| JP | 5407996 | B2 | 2/2014 |
| WO | 2005076986 | A2 | 8/2005 |
| WO | 2012175468 | A1 | 12/2012 |
| WO | 2022101794 | A1 | 5/2022 |

* cited by examiner

CONTROL SYSTEM FOR INDIVIDUAL ACTUATION OF BRAKE CALIPER PISTONS

TECHNICAL FIELD

Example embodiments generally relate to vehicle control systems and, more particularly, relate to a system for individually actuating brake caliper pistons.

BACKGROUND

Electrically actuated brakes currently exist in trailer drum brake applications, and in various parking brake applications where signals are sent to either an electromagnet or a direct current (DC) motor actuator to control the amount of brake torque to be applied. Similar brake systems are being offered as an option by automotive brake system suppliers, thereby replacing the hydraulically actuated brake systems that are common today.

As this technological migration occurs, it may be desirable to develop better ways of actuating and monitoring brake system components.

BRIEF SUMMARY OF SOME EXAMPLES

In accordance with an example embodiment, a vehicle control system for a vehicle may be provided. The system may include a first friction brake member that rotates with a wheel of the vehicle, a second friction brake member that is displaced from an initial position to initiate contact with the first friction brake member to apply braking torque to the wheel, a displacement assembly operably coupled to the second friction brake member to move the second friction brake member responsive to a brake torque request, a sensor network to measure displacement information of the displacement assembly from the initial position to a point of contact between the first and second friction brake members, and a control module operably coupled to the sensor network to record the displacement information to define recorded displacement information, and to determine tapering of the second friction brake member based on the recorded displacement information.

In another example embodiment, a control module for monitoring brake pad wear in a vehicle may be provided. The module may include processing circuitry to employ a method of determining results of tapering on a brake pad. The method may include measuring and recording piston displacement of a first piston disposed proximate to a brake pad at a first location and a second piston disposed proximate to the brake pad at a second location in response to a brake actuation, comparing the recorded piston displacement for each of the first and second pistons to each other to determine whether a displacement difference exists, in response to the displacement difference existing, determining an amount of taper of the brake pad, recommending replacement of the brake pad in response to the amount of taper exceeding a replacement threshold, and determining a correction factor for applying braking torque to the first piston or the second piston in response to the amount of taper not exceeding the replacement threshold.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
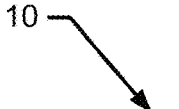
FIG. 1 illustrates a block diagram of a brake assembly of a vehicle.
Figure 1:
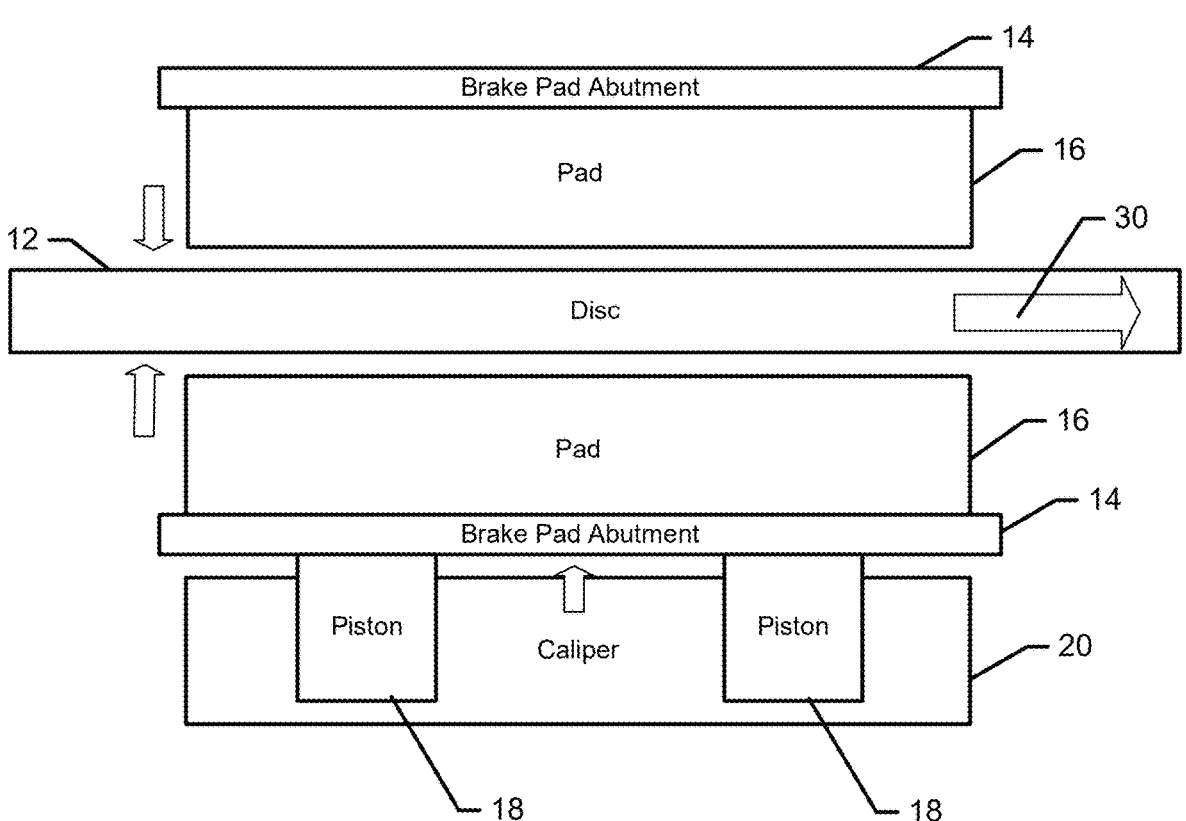

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

One issue that arises in the context of brake applications (and particularly in the context of performance brake applications) is uneven wear of brake pads. In this regard, FIG. 1 illustrates a brake pad assembly 10 including a rotor or disc 12 that rotates with the wheel of the vehicle, a brake pad abutment 14, a brake pad 16, a piston assembly 18, and a caliper 20, which houses the brake pad 16 and the piston assembly 18. The disc 12 rotates, for example, in the direction of arrow 30 and therefore when the piston assembly 18 is actuated to push the brake pad abutment 14 toward the disc 12, the contact between the brake pad 16 and the disc 12 creates a turning moment on the brake pad 16 and unequal pressure distribution across the surface of the brake pad 16. The unequal pressure distribution specifically tends to result in a lower pressure at the disc exit side (i.e., the side of the brake pad 16 closest to arrow 30) and this causes more brake pad wear at the opposite side of the brake pad 16. The increased brake pad wear at one side of the brake pad 16 causes a phenomenon that is called tapering of the brake pad 16. In this regard the thickness of the brake pad 16 is different at the front and rear (or entry and exit) sides of the brake pad 16. When the brake pad 16 develops a taper, the taper can be exacerbated further over time, but in any case generally leads to an earlier need for replacement of the brake pad 16.

One way this phenomenon is mitigated is to change the sizes of the pistons in the piston assembly 18. In such examples, the piston at the disc entry side (the side opposite arrow 30) is smaller than the piston at the disc exit side (i.e., the piston on the same side as the arrow 30). The smaller piston on the disc entry side exerts a lower pressure that hopefully means that a balanced or uniform pressure can be applied to the opposing sides of the brake pad 16, and wear on the brake pad 16 will consequently be more even (thereby preventing taper). However, this method results in more complicated part designs, may also experience changes in force application over time that cannot easily be accounted for, and is also only optimized for a limited combination of brake pressure and pad thicknesses. Thus, it may be desirable to design a simpler system that may still provide superior performance that is adaptive over time.

Figure 2:
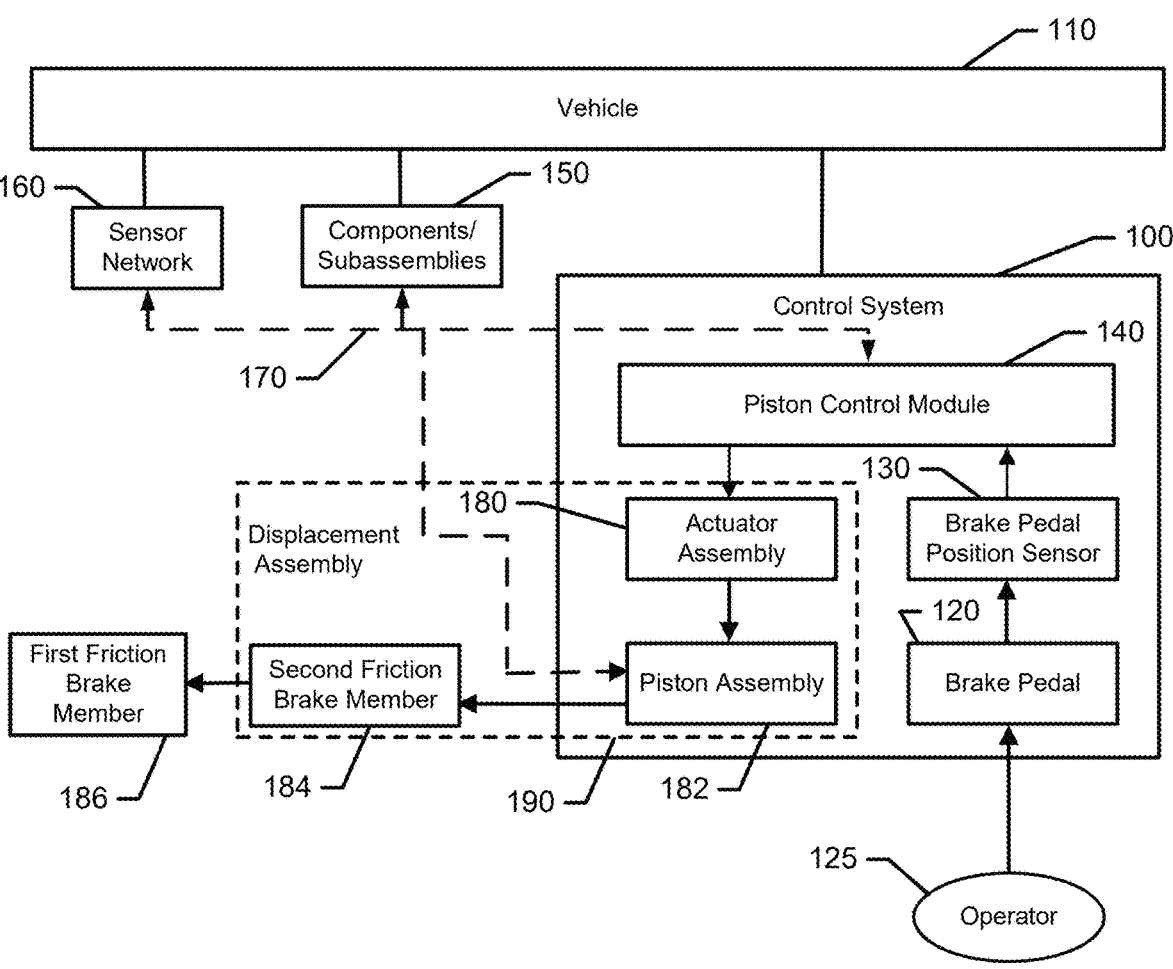
FIG. 2 illustrates a block diagram of a vehicle control system in accordance with an example embodiment.

FIG. 2 illustrates a block diagram of a vehicle control system 100 of an example embodiment that may provide such adaptability over time. The components of the control system 100 may be incorporated into a vehicle 110 (e.g., via being operably coupled to a chassis of the vehicle 110, various components of the vehicle 110 and/or electronic control systems of the vehicle 110). Of note, although the components of FIG. 1 may be operably coupled to the vehicle 110, it should be appreciated that such connection may be either direct or indirect. Moreover, some of the components of the control system 100 may be connected to the vehicle 110 via intermediate connections to other components either of the chassis or of other electronic and/or mechanical systems or components.

The control system 100 may include one or more input devices in the form of one or more control pedals. In some embodiments, the control pedals may include a brake pedal 120. However, the control pedals could alternatively be hand operated or any other operable member via which an operator 125 may provide an input indicative of an intent of the operator 125 relative to controlling net torque for application to the wheels of the vehicle 110. The control system 100 may also include a position sensor for the brake pedal 120 in the form of a corresponding brake pedal position sensor 130. The brake pedal position sensor 130 may provide a signal as an output, and the signal may be indicative of the precise position of the brake pedal 120 relative to a range of motion of the brake pedal 120.

In an example embodiment, the control system 100 may receive information that is used to determine vehicle status from various components or subassemblies 150 of the vehicle 110. Additionally or alternatively, various sensors that may be operably coupled to the components or subassemblies 150 may be included, and may provide input to the control system 100 that is used in determining vehicle status. Such sensors may be part of a sensor network 160 and sensors of the sensor network 160 may be operably coupled to the control system 100 (and/or the components or subassemblies 150) via a vehicle communication bus (e.g., a controller area network (CAN) bus) 170. However, it should be appreciated that individual communication buses may be employed for respective individual components, systems or assemblies in some cases.

The components or subassemblies 150 may include, for example, a braking system, a propulsion system and/or a wheel assembly of the vehicle 110. The braking system may be configured to provide braking inputs to braking components of the vehicle 110 (e.g., electromechanical brakes) based on a braking torque that is generated in proportion to the signal produced by the brake pedal position sensor 130. In some embodiments, actuation of the braking torque may be accomplished at least in part via operation of a piston control module 140, which will be described in greater detail below. The piston control module 140 may be operably coupled to an actuator assembly 180 that may in turn move one or more pistons of a piston assembly 182 to reposition the one or more pistons and thereby also move a second friction brake member 184 (e.g., a brake pad or shoe) relative to a first friction brake member 186 (e.g., a disc, drum or rotor). The second friction brake member 184, piston assembly 182 and/or actuator assembly 180 may be operably coupled to and/or housed in a caliper and form a displacement assembly 190. Moreover, in some cases, the brake pad (and corresponding components that move the brake pad) may be duplicated on opposite sides of the rotor.

Accordingly, for example, the control system 100 may be able to receive numerous different parameters, indications and other information that may be related to or indicative of different situations or conditions associated with vehicle status. The control system 100 may also receive information indicative of the intent of the operator 125 relative to control of various aspects of operation of the vehicle 110 and then be configured to use the information received to provide instructions to control system 100 in order to control application of braking torque to the wheels of the vehicle 110. The control system 100 of FIG. 1 may be similar to conventional systems in many respects, except that, the control system 100 may be modified to include the piston control module 140 as described in greater detail in reference to FIGS. 3 and 4.

Figure 3:
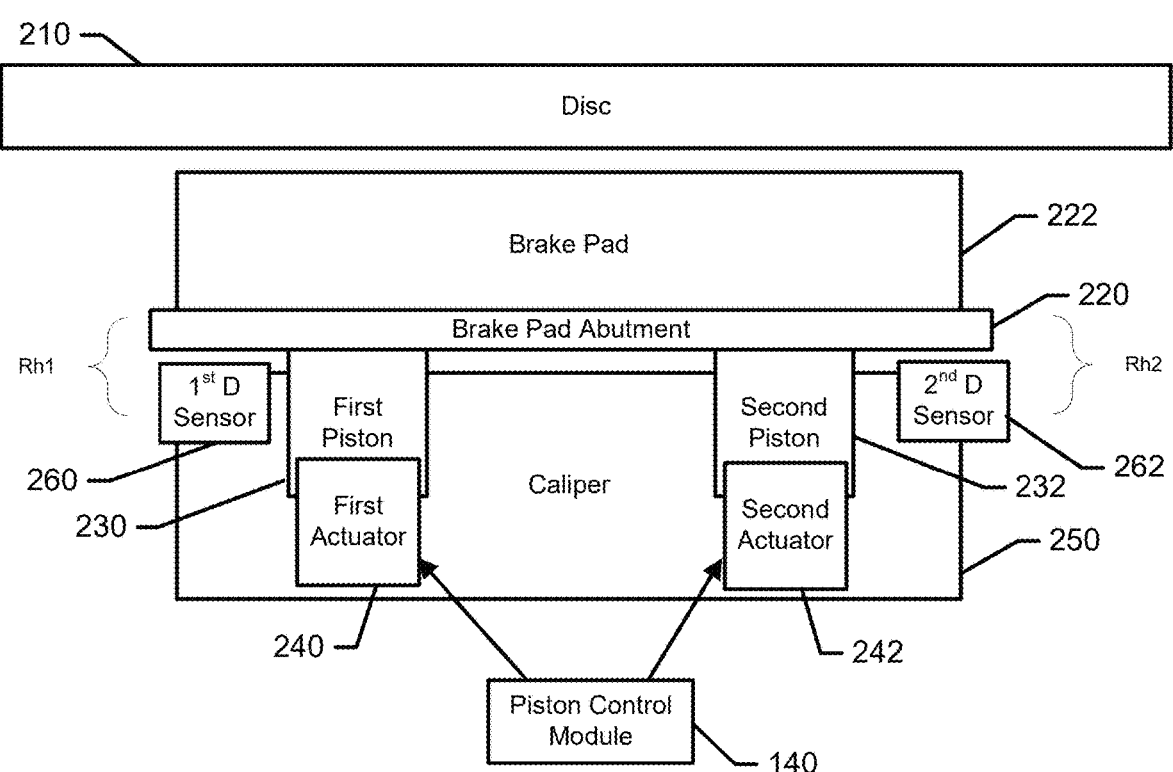
FIG. 3 illustrates a block diagram of some components of a brake assembly in accordance with an example embodiment.

FIG. 3 illustrates a block diagram of various components of a brake assembly 200 of an example embodiment in greater detail. In this regard, for example, FIG. 3 illustrates a brake rotor (or disc 210) along with a brake pad abutment 220, and brake pad 222. A first piston 230 and a second piston 232 may be provided as a piston assembly to extend or retract to move the brake pad abutment 220 based on operation of a first actuator 240 and a second actuator 242, respectively, where the first and second actuators 240 and 242 are either mechanical or electrical control elements for providing pressure control. The first and second pistons 230 and 232 may therefore be understood to be example components of the piston assembly 182 of FIG. 2. However, it should be further appreciated that the piston assembly 182 may include more than two pistons in some example embodiments. Meanwhile, the first and second actuators 240 and 242 may be understood to be example components of the actuator assembly 180 of FIG. 2. Again, it should be further appreciated the actuator assembly 180 may include more than two actuators in some embodiments. If more than two pistons are employed, a corresponding number of actuators may also be employed to individually actuate and move each of the pistons.

The first and second actuators 240 and 242 and the first and second pistons 230 and 232 may be embodied in a number of suitable ways. In this regard, for example, the first and second actuators 240 and 242 may be electrically operable motors (AC or DC), servos, magnetically operable actuators, electromagnets, and/or the like, as well as mechanically or hydraulically operable actuators. The first and second actuators 240 may be actuated mechanically or electronically via the application of an electrical signal or trigger, and may move the first and second pistons 230 and 232, respectively, via corresponding gear sets, lever arms, or other linkages.

The brake pad 222 (and the brake pad abutment 220), the first and second pistons 230 and 232, and the first and second actuators 240 and 242, may be operably coupled to and/or housed within a caliper 250. Moreover, as discussed above, the brake pad 222 (and the brake pad abutment 220), the first and second pistons 230 and 232, and the first and second actuators 240 and 242 that are shown in FIG. 3 may be duplicated on the opposite side of the disc 210, and may therefore effectively mirror the components shown in FIG. 3 operating from the caliper 250 to engage opposing sides of the disc 210 when the first and/or second actuators 240 and 242 receive actuation signals from the piston control module 140.

In an example embodiment, the first and second pistons 230 and 232 may each have normal operating range that extends from a fully retracted to a fully extended position. When fully retracted, the brake pad 222 may be spaced apart from the disc 210 so that no braking torque is applied. When fully extended, the brake pad 222 may exert maximum braking torque on the disc 210. Generally speaking, the first piston 230 may have a corresponding first range (Rh1) that defines the range from fully retracted to fully extended, and the second piston 232 may have a corresponding second range (Rh2) that defines the range from fully retracted to fully extended. At some point of extension (e.g., some percentage of full extension within the first and second ranges (Rh1 and Rh2)) for each of the first and second pistons 230 and 232, the brake pad 222 makes first contact with the disc 210. This point will increase over time as more brake pad 222 wear occurs. The first and second ranges (Rh1 and Rh2) may be defined in terms of a distance or a percentage of the total distance. Thus, for example, if the difference between fully extended and fully retracted positions is 5 mm, then the first and second ranges (Rh1 and Rh2) may each be defined as being about 5 mm of total piston travel, or 5 mm of fully extended travel may be considered to be 100% and full retraction (or 0 mm of extension) may be 0%. If initial contact between the brake pad 222 and the disc 210 occurs at 0.2 mm of piston travel for each of the first and second pistons 230 and 232 when the brake pad 222 is new, then 4% may define the initial contact point. Thereafter, as brake pad 222 wear occurs, it may be expected that 0.3 mm of travel is required to initiate contact and reach the initial point of contact (i.e., 6%).

As can be appreciated from this description, any difference in either the distance traveled (or percentage of the range of travel) to achieve first contact between the brake pad 222 and the disc 210 between the first and second pistons 230 and 232 may be attributed to respective different brake pad 222 thicknesses in the areas of the brake pad 222 that are proximate to the first and second pistons 230 and 232, respectively. Accordingly, by measuring the amount of piston extension required to achieve initial contact, it may be possible to determine brake pad 222 thickness, and changes in brake pad 222 thickness over time. Moreover, when differences in such thicknesses are detected, it may further be possible to determine the amount of taper that is being (or has been) initiated at the surface of the brake pad 222. Corrective action may also be taken to alter the force exerted on each respective one of the first and second pistons 230 and 232 in order to attempt to even out the wear on the brake pad 222 and thereby extend the useful life of the brake pad 222 by preventing or correcting the taper.

Accordingly, as shown in FIG. 3, a first displacement sensor 260 may be provided to determine a piston displacement for the first piston 230 (e.g., when initial contact between the brake pad 222 and the disc 210 occurs in an area of the brake pad 222 that is proximate to the first piston 230). A second displacement sensor 262 may be provided to determine a piston displacement for the second piston 232 (e.g., when initial contact between the brake pad 222 and the disc 210 occurs in an area of the brake pad 222 that is proximate to the second piston 232). The first and second displacement sensors 260 may be configured to measure piston displacements either directly or indirectly. In this regard, for example, direct measurements may be made using a Hall effect sensor, magnetic reed switches, optical sensors, and/or the like that may directly read or determine a distance the piston being measured has traveled away from the fully retracted position. As noted above, the direct measurement may be made in terms of an actual distance, or in terms of a percentage of the full range of possible displacement that is defined by the first and second ranges (Rh1 and Rh2).

Indirect measurements may be made by measuring a displacement of a part of the first and second actuators 240 and 242 using similar or different means to those described above for directly measuring the displacement of pistons. However, in some cases, indirect measurements may be inferred based on time of application of power or a trigger signal to the first and second actuators 240 and 242. In this regard, for example, if the first and second actuators 240 and 242 have either a fixed or known speed of operation based on excitation provided thereto, then the time that the first and second actuators 240 and 242 are actuated multiplied by the fixed or known speed may indicate how much displacement had been provided to the corresponding pistons (e.g., the first and second pistons 230 and 232, respectively). In some other alternatives, the first and second actuators 240 and 242 may rotate and such rotation may (e.g., via gears) extend the pistons. In such examples, the amount of rotation of the first and second actuators 240 and 242 may be indicative of the amount of displacement of the pistons. Combinations of direct and indirect measurements may be made in some cases to enhance accuracy of the readings and measurements.

The readings of the respective piston displacement values may be provided to the piston control module 140 to enable the piston control module 140 to determine whether taper exists (or is beginning to form). Moreover, in response to a determination that some amount of taper exists or is forming, the piston control module 140 may alter the actuation of the first and/or second actuators 240 and 242 to modify the pressure applied (via the first and second pistons 230 and 232, respectively) to the brake pad 222 and disc 210 in respective regions and thereby even out or prevent taper. This response is described in more detail in reference to FIG. 4.

Figure 4:
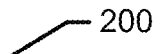
FIG. 4 illustrates a block diagram of some components of a piston control module in accordance with an example embodiment.
Figure 4:
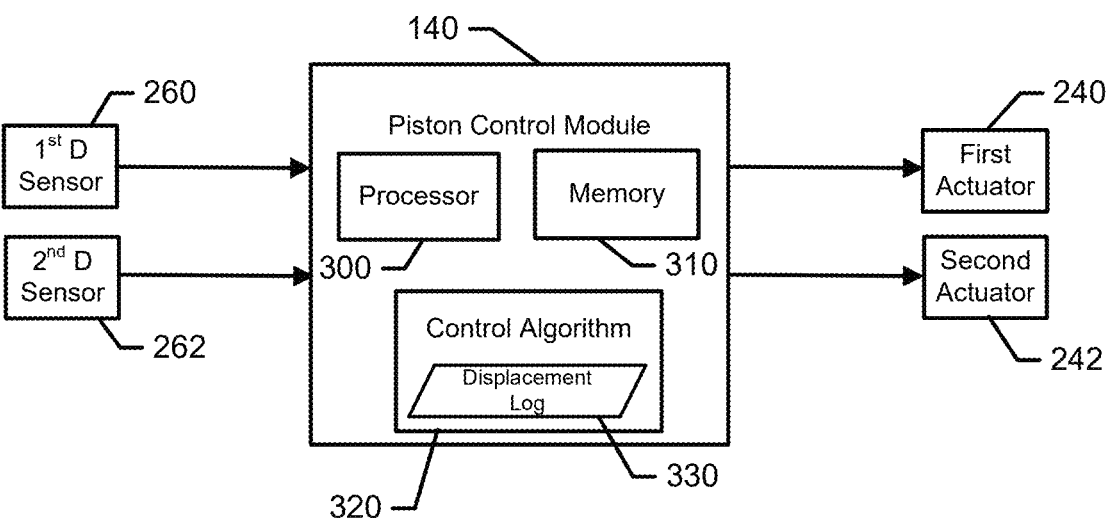

Turning now to FIG. 4, the piston control module 140 may employ processing circuitry (e.g., a processor 300 and memory 310) that may be configured to process the information received at the piston control module 140 and execute instructions for operation or actuation of the first actuator 240 and the second actuator 242 to position the first and second pistons 230 and 232 accordingly. Thus, the processing circuitry should be understood to be capable of being embodied as a circuit chip (e.g., an integrated circuit chip) or other functional entity configured (e.g., with hardware, software executed on hardware, or a combination of hardware and software) to perform operations described herein.

The processor 300 may execute instructions stored in the memory 310 to thereby be configured to execute a control algorithm 320 to perform a function substantially in real time. The control algorithm 320 or function executed may therefore execute various control actions based on the information or instructions received, and generate outputs to drive the activities of the piston control module 140 as described herein. The piston control module 140 may therefore itself be embodied as the control algorithm 320, or may include control algorithms (including the control algorithm 320) in the form of functional modules (or sub-modules) configured to perform specific functions for which they are configured relating to handling various configuration settings the vehicle 110 in the manner described herein.

In an example embodiment, the control algorithm 320 may receive displacement information associated with a movable friction brake component (e.g., a brake pad or shoe) that is measured responsive to actuation of the brakes. In some examples, the actuation of the brake pedal 120 may cause generation of a signal by the brake pedal position sensor 130 that may be provided to the piston control module 140 (and therefore also to the control algorithm 320). When provided, the signal may indicate a brake torque request (e.g., based on the amount of deflection of the brake pedal 120) and inform the piston control module 140 of the same so that the piston control module 140 can receive the displacement information measured by the sensor network 160 (e.g., the first and second displacement sensors 260 and 262) and record the measurements in a displacement log 330.

The displacement log 330 may record time/date and displacement of the piston (or pistons) measured for initial contact between the brake pad 222 and the disc 210 responsive to movement of respective pistons (e.g., the first and second pistons 230 and 232) based on corresponding urging by the actuators (e.g., the first and second actuators 240 and 242). The displacement log 330 may therefore provide information to enable the control algorithm 320 to determine a change in displacement required to achieve contact over time, which is indicative of the amount of normal wear that has been experienced by the brake pad 222. The displacement log 330 may also be used to determine current thickness of the brake pad 222 at locations proximate to respective ones of the first and second pistons 230 and 232 based on subtracting the change in displacement from an original pad thickness (measured or estimated). The current thickness may also be used to determine whether to replace brake pads, whether tapering has occurred, or how to modify pressure applied to correct for, prevent or otherwise mitigate tapering phenomena as described in greater detail below.

Figure 5:
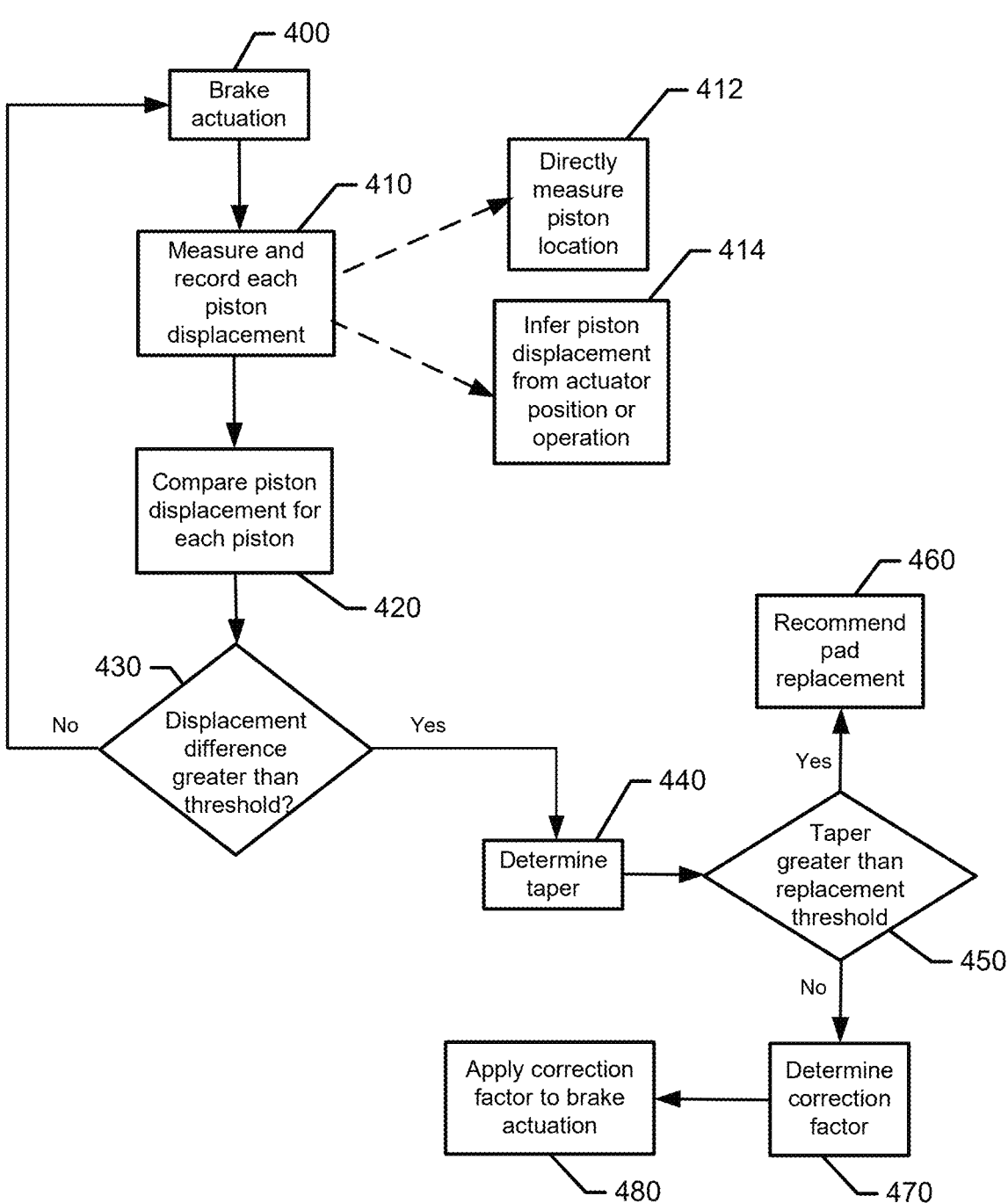
FIG. 5 illustrates a block diagram of various processes associated with performing a method of determining results of tapering on a brake pad in accordance with an example embodiment.

FIG. 5 illustrates a control flow diagram for operation or execution of the control algorithm 320 of an example embodiment. At operation 400, a brake actuation occurs. In some cases, operation 400 may be executed automatically when the vehicle is turned on (e.g., each time the vehicle is turned on), so that the control algorithm 320 only runs upon initial vehicle startup, and not during routine operation of the vehicle. When operated in this way, the initial turn on of the vehicle may simply trigger a brake signal to be applied by the piston control module 140 to trigger the actuator assembly 180 (e.g., the first and second actuators 240 and 242) to actuate and move the piston assembly 182 (e.g., the first and second pistons 230 and 232). In such an example, the first and second pistons 230 and 232 may each move from the fully retracted or 0% position to a position at which the first and second pistons 230 and 232 each contact the disc 210.

When contact with the disc 210 is achieved, the first and second displacement sensors 260 and 262 may measure and record (e.g., in the displacement log 330) the piston displacements at contact for each of the first and second pistons 230 and 232, respectively, at operation 410 The piston displacement may be measured directly or indirectly by the first and second displacement sensors 260 and 262, as discussed above. Thus, for example, operation 410 may include directly measuring piston location at operation 412 to use current piston location (at the point of contact with the disc 210) as a direct indication of piston displacement. As an alternative, piston displacement may be inferred from either actuator position or from the time and speed of operation of the actuator at operation 414.

Regardless of exactly how the piston displacement is measured when contact with the disc 210 occurs, the respective piston displacements for each instance of piston in the piston assembly 182 may be recorded (e.g., in the displacement log 330) before operations 420 and following may occur. Moreover, operation 400 may also occur under different circumstances. In this regard, for example, instead of (or in addition to) being initiated at vehicle startup with an automatically initiated brake actuation, operation 400 could be experienced as (and operation 410 therefore executed in response to) any operator initiated brake actuation during the operation of the vehicle. In some cases, only the first operator initiated brake actuation after vehicle startup may be used in connection with the control algorithm 320. However, in other cases, either each and every operator initiated brake actuation may also have operations 410 and following be triggered thereafter, or a predetermined number of actuations may be counted before one such actuation is selected to be operation 400. In this regard, for example, every tenth or even every hundredth operator initiated brake actuation may be selected to act as operation 400 in connection with running the control algorithm 320. Alternatively, a predetermined time interval may be defined between brake actuations that trigger recording of displacement information.

After a brake actuation that is interpreted to correspond to operation 400 is experienced, and operation 410 has also been performed, the control algorithm 320 may then perform operation 420, which includes a comparison of piston displacement for each piston. A determination may then be made at operation 430 as to whether there is a difference in piston displacement measurements that is greater than a threshold value. The threshold may be selected based on experience regarding indications of taper formation. If there is no difference in displacement measurements, or if any such difference is below the threshold value associated with operation 430, then control flow may return to wait for the next instance of operation 400. However, if there is a difference in displacement measurements that is greater than the threshold then the control algorithm 320 may proceed to determine or calculate the amount of taper of the brake pad 222 at operation 440. It is also noteworthy that example embodiments could be practiced in situations where there is only a single actuator and piston as well. In those examples, operations 420 and 430 may be omitted.

Determining the taper may effectively be a calculation based on an estimated initial thickness, and the departure therefrom based on the removal of material due to natural wear of the brake pad 222 causing corresponding changes in the thickness of the brake pad 222 proximate to each respective one of the pistons. A thickness of the brake pad 222 proximate to each respective one of the pistons may be determined by subtracting the change in displacement from the first (or earliest set of) displacement measurements to the current displacement measurements from the estimated initial thickness. Thereafter, by knowing information on the geometry of the brake pad 222, the change in displacement over time, and knowledge of the distance between pistons, the taper may be determined via relatively simple geometrical calculation.

In some cases, after taper is determined, the amount of taper may be compared to a replacement threshold for the brake pad 222. If the amount of taper is greater than the replacement threshold, then pad replacement may be recommended at operation 460. The recommendation may be the actuation of a notification light on the dash or control panel of the vehicle, or any other location in the cabin of the vehicle. However, in some embodiments, the recommendation may be provided by an externally generated email, text message or other notification that is sent to the registered owner or operator of the vehicle. In such examples, the vehicle may report the exceeding of the replacement threshold to a central server or cloud-based service and the server or service may generate the notification that is sent to the owner or operator.

If the taper determined is not greater than the replacement threshold, operation may continue without any change at all in some cases. However, in other cases, it may be possible to make adjustments to the pressure applied to one or more of the pistons to account for (and perhaps correct for) the taper that has been measured. Thus, for example, a correction factor may be determined at operation 470, and the correction factor may be applied to brake actuations at operation 480 to modify the amount of pressure exerted by respective ones of the pistons.

In an example embodiment, operation 470 may include a modification to the pressure to be applied at each (or at least one) of the piston locations. Thus, for example, one of the first or second actuators 240 or 242 may be actuated to apply more or less pressure than would otherwise have been the case, and the amount of pressure may be determined based on the taper determined. Thus, the vehicle can effectively (e.g., via the piston control module 140) control the pressure distribution for future brake applications to reduce taper by changing the pressure distribution of each piston to bias the part of the brake pad 222 that has the least wear (currently) to take on additional wear (going forward).

In some embodiments, the correction factor may be determined based on vehicle speed (and therefore corresponding rotational velocity of the disc 210 or rotor), measured or estimated pad thickness, and a magnitude of brake torque requested (e.g., based on pedal position). In this regard, for example, the piston control module 140 or control algorithm 320 may compensate for the estimated moment for the leading edge of the brake pad 222 by increasing force or pressure on the piston (e.g., among the first and second pistons 230 and 232) that is closest to the trailing edge of the brake pad 222. Thus, for example, the control algorithm 320 may employ a lookup table having corresponding parameters outlined for respective correction factors. In cases where actuators are actuated for a given period of time in order to achieve a given brake torque or pressure, the lookup table may include time values for energizing the actuators to initiate contact with the disc 210 to reduce speed. Thus, for example, the correction factor may essentially correlate time during which energy is applied to the actuator to distance traveled by the pistons (and pads) to achieve desired ordering of contact (between pistons and respective portions of the pads) and/or the amount of force applied at each portion of the pads. For calipers that have more than two pistons per end, the increase in pressure or force application may be realized for each piston as a function of the piston's distance from the leading edge of the brake pad 222 or the front piston in order to ensure a more uniform pressure application for each piston. Other functional relationships may also be built into the control algorithm 320 with respect to pressure distribution commands for each piston based on caliper design and performance in use.

The control algorithm 320 may also be used to adjust the transfer function between requested brake torque and applied force from the driver to ensure a linear relationship (if desired) between force applied or brake torque while also adjusting the relationship based on the maximum desired applied force from the driver. For example, if the driver only wants to apply 100 lbs of force to realize a maximum braking force, the vehicle can adjust for this due to having no connected physical relationship between the brake pedal and each of the actuators.

Although the control algorithm 320 may be used to apply corrective forces, even on an individual piston or actuator basis through software control and electronic signals applied to electric actuators in some cases. Some embodiments applied to hydraulically connected pistons may employ corrections through the provision of a hydraulic pressure control mechanism that is mechanically implemented. In this regard, for example, biasing of a brake pad portion that is less worn toward evening out wear on the pad in response to a brake torque request requires more force or pressure after initial contact with the rotor at the thicker portion of the pad, regardless of where first contact occurs. In other words, once contact between pad and rotor is achieved, the distance traveled, and which piston initiates contact between its respective brake pad portion and the rotor first, no longer matter in terms of evening out wear, and it then transitions to an issue of increasing the force/pressure in the area where additional wear is desired (e.g., at the thicker part of the pad). While the correction factor may achieve this result in some cases, some embodiments (e.g., hydraulically connected pistons) may further employ pressure control valves (e.g., electromechanical poppet valves) to allow for accurate hydraulic pressure control between each piston to apply specific amounts of pressure to each piston to balance wear. In such embodiments, the correction factor or other control algorithm instructions may define how and when to operate the electromechanical poppet valves between pistons on the same side of the calipers in a controlled way to apply different amounts of force in a desired location on the pad to equalize wear.

Notably, although examples described above primarily relate to disc brakes, similar concepts could also be employed with respect to drum brakes where the movement of brake shoes may be radially inward and outward instead of being inward and outward in an axial direction (parallel to the axis of the rotor or disc), which is employed for disc brakes with brake pads.

A vehicle control system for a vehicle may therefore be provided. The system may include a first friction brake member that rotates with a wheel of the vehicle, a second friction brake member that is displaced from an initial position to initiate contact with the first friction brake member to apply braking torque to the wheel, a displacement assembly operably coupled to the second friction brake member to move the second friction brake member responsive to a brake torque request, a sensor network to measure displacement information of the displacement assembly from the initial position to a point of contact between the first and second friction brake members, and a control module operably coupled to the sensor network to record the displacement information to define recorded displacement information, and to determine tapering of the second friction brake member based on the recorded displacement information.

The system of some embodiments may include additional features, modifications, augmentations and/or the like to achieve further objectives or enhance performance of the system. The additional features, modifications, augmentations and/or the like may be added in any combination with each other. Below is a list of various additional features, modifications, and augmentations that can each be added individually or in any combination with each other. For example, the first friction brake member may be a brake rotor or disc, and the second friction brake member may be a brake pad. However, alternatively, the first friction brake member may be a brake drum, and the second friction brake member may be a brake shoe. In an example embodiment, the displacement assembly may include a piston assembly and an actuator assembly. The piston assembly may include a first piston and a second piston operably coupled to the brake pad at respective locations of the brake pad. The actuator assembly may include a first actuator and a second actuator operably coupled to the first and second pistons, respectively, to displace the first and second pistons to move the brake pad from the initial position to the point of contact between the pad and rotor. The sensor network may include a first displacement sensor to measure a first displacement for the first piston and a second displacement sensor to measure a second displacement for the second piston. The first and second displacements may be measured and recorded in a displacement log. In some cases, the control module may determine whether the brake pad is tapered beyond a threshold amount based on a comparison of the first and second displacements. In an example embodiment, a notification may be provided to an operator of the vehicle responsive to the brake pad being tapered beyond the threshold amount. In some cases, the control module may determine a correction factor for modifying an input to one or both of the first and second actuators based on the comparison of the first and second displacements. In an example embodiment, the first and second displacement sensors may either indirectly or directly measure the first and second displacements, respectively. Such indirect measurements may include measuring the first and second displacements based on an amount of time the first and second actuators, respectively, are actuated. In an example embodiment, the control module may record the displacement information to define the recorded displacement information by initiating the brake torque request in response to a startup of the vehicle. In some cases, the control module records the displacement information to define the recorded displacement information in response to each operator initiated instance of the brake torque request. In an example embodiment, alternatives (or additions) to this control paradigm may include the control module recording the displacement information to define the recorded displacement information in response to a predetermined number of operator initiated instances of the brake torque request. In some cases, the tapering may be determined based on subtracting a change in displacement over a lifetime of the second friction brake member from an initial thickness of the second friction brake member.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A vehicle control system of a vehicle, the system comprising:
a first friction brake member that rotates with a wheel of the vehicle;
a second friction brake member that is displaced from an initial position to initiate contact with the first friction brake member to apply braking torque to the wheel;
a displacement assembly operably coupled to the second friction brake member to move the second friction brake member responsive to a brake torque request;
a sensor network to measure displacement information of the displacement assembly from the initial position to a point of contact between the first and second friction brake members; and
a control module operably coupled to the sensor network to record the displacement information to define recorded displacement information, and to determine tapering of the second friction brake member based on the recorded displacement information.

2. The vehicle control system of claim 1, wherein the first friction brake member is a brake rotor or disc, and wherein the second friction brake member is a brake pad.

3. The vehicle control system of claim 2, wherein the displacement assembly comprises a piston assembly and an actuator assembly,
wherein the piston assembly comprises a first piston and a second piston operably coupled to the brake pad at respective locations of the brake pad,
wherein the actuator assembly comprises a first actuator and a second actuator operably coupled to the first and second pistons, respectively, to displace the first and second pistons to move the brake pad from the initial position to the point of contact between the first and second friction brake members,
wherein the sensor network comprises a first displacement sensor to measure a first displacement for the first piston and a second displacement sensor to measure a second displacement for the second piston, and
wherein the first and second displacements are measured and recorded in a displacement log.

4. The vehicle control system of claim 3, wherein the control module determines whether the brake pad is tapered beyond a threshold amount based on a comparison of the first and second displacements.

5. The vehicle control system of claim 4, wherein a notification is provided to an operator of the vehicle responsive to the brake pad being tapered beyond the threshold amount.

6. The vehicle control system of claim 4, wherein the control module determines a correction factor for modifying an input to one or both of the first and second actuators based on the comparison of the first and second displacements.

7. The vehicle control system of claim 3, wherein the first and second displacement sensors directly measure the first and second displacements, respectively.

8. The vehicle control system of claim 3, wherein the first and second displacement sensors indirectly measure the first and second displacements, respectively.

9. The vehicle control system of claim 8, wherein the first and second displacements are measured based on an amount of time the first and second actuators, respectively, are actuated.

10. The vehicle control system of claim 1, wherein the first friction brake member is a brake drum, and wherein the second friction brake member is a brake shoe.

11. The vehicle control system of claim 1, wherein the control module records the displacement information to define the recorded displacement information by initiating the brake torque request in response to a startup of the vehicle.

12. The vehicle control system of claim 1, wherein the control module records the displacement information to define the recorded displacement information in response to each operator initiated instance of the brake torque request.

13. The vehicle control system of claim 1, wherein the control module records the displacement information to define the recorded displacement information in response to a predetermined number of operator initiated instances of the brake torque request.

14. The vehicle control system of claim 1, wherein the tapering is determined based on subtracting a change in displacement over a lifetime of the second friction brake member from an initial thickness of the second friction brake member.

15. The vehicle control system of claim 1, wherein the control module determines a correction factor for modifying a pressure distribution to the displacement assembly for applying pressure to different portions of the second friction brake member based on the recorded displacement information.

16. The vehicle control system of claim 1, wherein pressure control valves are disposed between pistons of the displacement assembly to control the pressure distribution.

17. A control module for monitoring brake pad wear in a vehicle, the module comprising processing circuitry to employ a method comprising:

measuring and recording piston displacement of a first piston disposed proximate to a brake pad at a first location and a second piston disposed proximate to the brake pad at a second location in response to a brake actuation;

comparing the recorded piston displacement for each of the first and second pistons to each other to determine whether a displacement difference exists;

in response to the displacement difference existing, determining an amount of taper of the brake pad;

recommending replacement of the brake pad in response to the amount of taper exceeding a replacement threshold; and determining a correction factor for applying braking torque to the first piston or the second piston in response to the amount of taper not exceeding the replacement threshold.

18. The control module of claim 17, wherein measuring and recording the piston displacement of the first and second pistons comprises directly or indirectly measuring a displacement of each of the first piston and the second piston and recording the displacement of the each of the first piston and the second piston in a displacement log.

19. The control module of claim 17, wherein measuring and recording the piston displacement of the first and second pistons is performed by automatically initiating a brake torque request in response to a startup of the vehicle.

20. The control module of claim 17, wherein measuring and recording the piston displacement of the first and second pistons is performed in response to each operator initiated instance of the brake torque request or in response to a predetermined number of operator initiated instances of the brake torque request.

* * * * *